(12) United States Patent
Takahashi et al.

(10) Patent No.: US 8,511,916 B2
(45) Date of Patent: Aug. 20, 2013

(54) BLADE DRIVING DEVICE AND OPTICAL INSTRUMENT

(75) Inventors: Hiroshi Takahashi, Chiba (JP); Seiichi Oishi, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/429,818

(22) Filed: Mar. 26, 2012

(65) Prior Publication Data
US 2012/0183287 A1 Jul. 19, 2012

Related U.S. Application Data

(63) Continuation of application No. PCT/JP2011/050135, filed on Jan. 6, 2011.

(30) Foreign Application Priority Data

Feb. 22, 2010 (JP) ................................. 2010-035673

(51) Int. Cl.
*G03B 9/08* (2006.01)
(52) U.S. Cl.
USPC ......................................................... 396/454
(58) Field of Classification Search
USPC ......................................................... 396/454
See application file for complete search history.

(56) References Cited

U.S. PATENT DOCUMENTS
2008/0267615 A1* 10/2008 Nishio ........................... 396/453

FOREIGN PATENT DOCUMENTS

| JP | 52-84230 | 6/1977 |
|---|---|---|
| JP | 55-164630 | 11/1980 |
| JP | 10-186450 | 7/1998 |
| JP | 10-319472 | 12/1998 |
| JP | 2000-47286 | 2/2000 |
| JP | 2005-24640 A1 | 1/2005 |
| JP | 2008-058400 | 3/2008 |
| JP | 2009-3382 A1 | 1/2009 |

OTHER PUBLICATIONS

Notification of Reasons for Refusal received from the Japanese Patent Office in counterpart application No. 2010-035673 dated Aug. 21, 2012 with English translation (8 pages).
International Search Report for International Application No. PCT/JP2011/050135 dated Feb. 22, 2011.
Notification of Submission of Opinion mailed Apr. 18, 2013 from the Korean Intellectual Property Office regarding counterpart application No. 10-2012-7007684 with English translation (10 pages).

* cited by examiner

*Primary Examiner* — Clayton E Laballe
*Assistant Examiner* — Dennis Hancock
(74) *Attorney, Agent, or Firm* — Kratz, Quintos & Hanson, LLP (57) ABSTRACT

A blade driving device includes: a board including an opening; a blade movable between a position receding from the opening and a position overlapping at least a part of the opening; and a buffering member having a loop shape, having an elasticity, abutting the blade at an end of a movable range of the blade, and being deformable such that the loop shape is warped when abutting against the blade.

9 Claims, 9 Drawing Sheets

BLADE DRIVING DEVICE AND OPTICAL INSTRUMENT

CROSS-REFERENCE TO RELATED APPLICATION

This application is a continuation of and claims priority to International Patent Application No. PCT/JP2011/050135 filed on Jan. 6, 2011, which claims priority to Japanese Patent Application No. 2010-035673 filed on Feb. 22, 2010, subject matter of these patent documents is incorporated by reference herein in its entirety.

BACKGROUND (i) Technical Field

The present invention relates to blade driving devices and optical instruments.

(ii) Related Art

Japanese Unexamined Patent Application Publication No. 2000-047286 discloses a blade driving device equipped with a buffering member for abutting a blade at an end of a movable range of the blade and stopping the blade. The buffering member is made of an elastic material. The elasticity of the buffering member prevents the blade from bounding when the blade abuts the buffering member.

In cases where the blade moves at high speed, the blade might bound even when such a buffering member is provided.

SUMMARY

It is therefore an object of the present invention to provide a blade driving device and an optical instrument that suppress a blade from bounding.

According to an aspect of the present invention, there is provided a blade driving device including: a board including an opening; a blade movable between a position receding from the opening and a position overlapping at least a part of the opening; and a buffering member having a loop shape, having an elasticity, abutting the blade at an end of a movable range of the blade, and being deformable such that the loop shape is warped when abutting against the blade.

DETAILED DESCRIPTION

Figure 1:
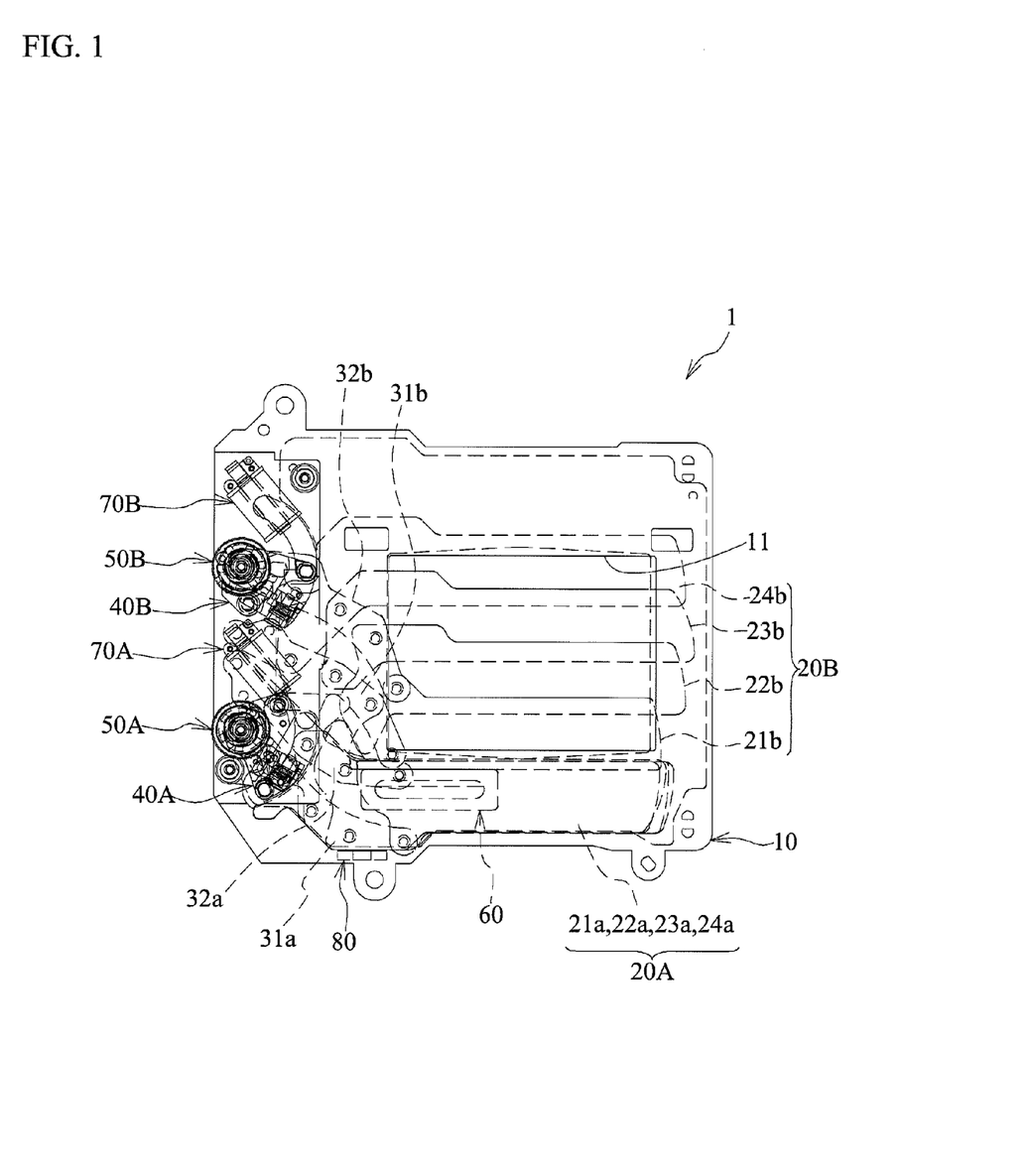
FIG. 1 is front view of a blade driving device according to the present embodiment.

An embodiment will be described with reference to the drawings as follows. FIG. 1 is front view of a blade driving device according to the present embodiment. A blade driving device 1 is a so-called focal plane shutter. As illustrated in FIG. 1, the blade driving device 1 includes: a board 10; blades 21a to 24a and 21b to 24b; drive arms 31a, 32a, 31b, and 32b; buffering members 60 and 80; and electromagnets 70A and 70B. The board 10 is made of a synthetic resin, and includes an opening 11 with a rectangular shape. Each of the blades 21a to 24a and 21b to 24b is made of a synthetic resin and is thinly formed. Also, each of the drive arms 31a, 32a, 31b, and 32b is made of a metal sheet to retain its strength. Each of the blades 21a to 24a and 21b to 24b move between a position of receding from the opening 11 and a position of covering at least part of the opening 11.

Four blades 21a to 24a configure leading blades 20A. Four blades 21b to 24b configure trailing blades 20B. FIG. 1 illustrates the leading blades 20A in an overlapped state and the trailing blades 20B in a expanded state. In FIG. 1, the leading blades 20A recedes from the opening 11 and the trailing blades 20B close the opening 11.

The buffering members 60 and 80 acts as stoppers for the trailing blades 20B and the leading blades 20A, respectively, as will be described later in detail. The blade 21b abuts the buffering member 60 and the blades 21a to 24a abut the buffering member 80 in the state illustrated in FIG. 1. The buffering members 60 and 80 each are made of a rubber elastically deformable.

The leading blades 20A are connected to the drive arms 31a and 32a. The trailing blades 20B are connected to the drive arms 31b and 32b. These drive arms 31a, 32a, 31b, and 32b are swingably supported by the board 10.

A leading-blades drive lever 40A and a trailing-blades drive lever 40B for respectively driving the drive arms 31a and 32b are provided in the board 10. The leading-blades drive lever 40A and the trailing-blades drive lever 40B are supported by the board 10 to be swingable in a predetermined range. Specifically, the leading-blades drive lever 40A is supported to swing about a spindle provided in the board 10. The swinging range of the leading-blades drive lever 40A is limited by a slot, mentioned later, formed in the board 10. This is applicable to the trailing-blades drive lever 40B.

The drive arm 31a is connected to the leading-blades drive lever 40A. The drive arm 32b is connected to the trailing-blades drive lever 40B. The swinging of the leading-blades drive lever 40A causes the drive arm 31a to swing, thereby moving the leading blades 20A. Likewise, the swinging of the trailing-blades drive lever 40B causes the drive arm 32b to swing, thereby moving the trailing blades 20B.

The leading-blades drive lever 40A and the trailing-blades drive lever 40B each holds an iron piece which does not have a reference numeral. The leading-blades drive lever 40A can swing between the position where the iron piece abuts the electromagnet 70A and the position where the iron piece recedes from the electromagnet 70A. This is applicable to the trailing-blades drive lever 40B.

Also, the leading-blades drive lever 40A is biased by a spring, not illustrated, in such a direction as to move away from the electromagnet 70A. Likewise, the trailing-blades drive lever 40B is biased by a spring, not illustrated, in such a direction as to move away from the electromagnet 70B.

Ratchet wheels 50A and 50B engage the leading-blades drive lever 40A and the trailing-blades drive lever 40B, respectively, through the springs mentioned above. One end of the spring, which biases the leading-blades drive lever 40A in such a direction as to move away from the electromagnet 70A, engages the ratchet wheel 50A. The other end of the spring engages the leading-blades drive lever 40A. The rotational amount of the ratchet wheel 50A is adjusted, thereby adjusting the biasing force of the spring. The ratchet wheel 50B also has a function similar to that of the ratchet wheel 50A.

The electromagnet 70A is energized, thereby adsorbing the iron piece of the leading-blades drive lever 40A. Likewise, the electromagnet 70B is energized, thereby adsorbing the iron piece of the trailing-blades drive lever 40B.

Figure 2:
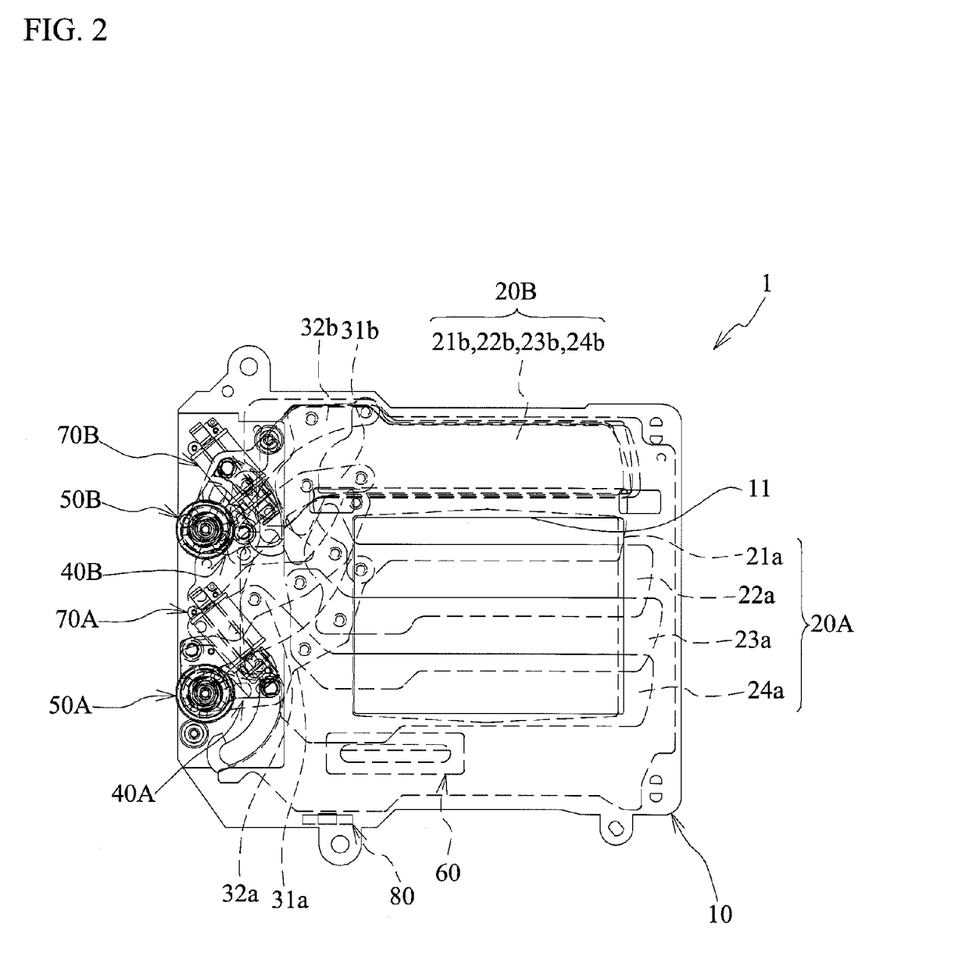
FIG. 2 is an explanatory view of an operation of the blade driving device.
Figure 3:
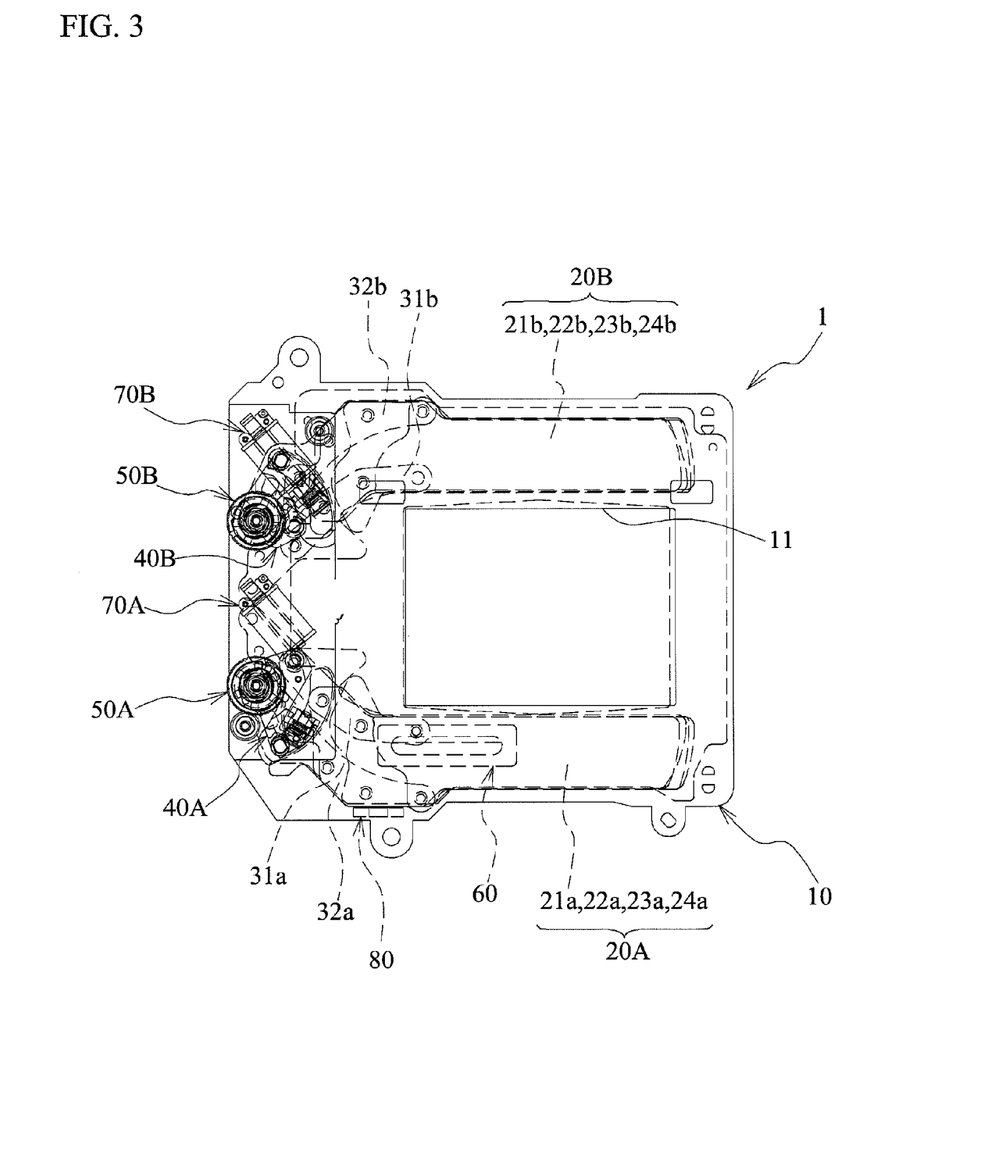
FIG. 3 is an explanatory view of the operation of the blade driving device.

Next, an operation of the blade driving device 1 will be described. FIGS. 1 to 3 are explanatory views of the operation of the blade driving device 1. Here, FIG. 2 illustrates the blade driving device 1 in an initial state. In this initial state, a set lever not illustrated is secured to an initial position, the leading blades 20A are expanded to close the opening 11, and the trailing blades 20B are overlapped each other to recede from the opening 11. In this initial state, the iron pieces of the leading-blades drive lever 40A and the trailing-blades drive lever 40B abut the electromagnets 70A and 70B respectively, and are set in such an initial position as to be adsorbed to them respectively.

In shooting, a release button of the camera is pushed to energize coils of the electromagnets 70A and 70B, whereby the iron piece of the leading-blades drive lever 40A is adsorbed to the electromagnet 70A and the iron piece of the trailing-blades drive lever 40B is adsorbed to the electromagnet 70B. After that, the set lever moves away from the leading-blades drive lever 40A and the trailing-blades drive lever 40B. At this time, the leading blades drive lever 40A and the trailing-blades drive lever 40B remain adsorbed to the electromagnets 70A and 70B, respectively.

Afterward, the energization of the coil of the electromagnet 70A is stopped, thereby rotating the leading-blades drive lever 40A in a clockwise direction by the biasing force of the spring as illustrated in FIG. 3. Therefore, the leading blades 20A move away from the opening 11 to be in the overlapped state. Also, the energization of the coil of the electromagnet 70B remains for a predetermined period, whereas the trailing blades 20B remain away from the opening 11. This causes the opening 11 to be in an opened state. FIG. 3 illustrates an exposed state.

The leading blades 20A recede from the opening 11 to abut the buffering member 80. A swingable range of the leading-blades drive lever 40A is defined by a slot, formed in the board 10, engaging the leading-blades drive lever 40A. For this reason, when the leading-blades drive lever 40A is rotated by the biasing force of the spring, the leading-blades drive lever 40A might abut an end portion of the slot and bound. As a result, the leading blades 20A also might bound. However, the leading blades 20A abut the buffering member 80 at the end of the movable range of the leading blades 20A. This suppresses the leading blades 20A and the leading-blades drive lever 40A from bounding.

After a predetermined period lapses from a time when the release button is pushed, the energization of the coil of the electromagnet 70B is stopped, and then the trailing-blades drive lever 40B rotates clockwise by the biasing force of the spring. Therefore, the trailing blades 20B are expanded to close the opening 11. At this time, a blade 21b positioned at the most leading position in the movable direction of the trailing blades 20B abuts the buffering member 60. Simultaneously, the trailing-blades drive lever 40B abuts an end portion of a slot, formed in the board 10, engaging the trailing-blades drive lever 40B. FIG. 1 illustrates the state just after the exposure operation is finished. In such a way, one cycle of shooting is finished.

Next, the leading-blades drive lever 40A and the trailing-blades drive lever 40B are rotated counterclockwise by the set lever not illustrated. Therefore, the leading blades 20A are expanded to close the opening 11 and the trailing blades 20B are overlapped each other to recede from the opening 11, whereby the state is returned to the initial state illustrated in FIG. 2.

Figure 4:
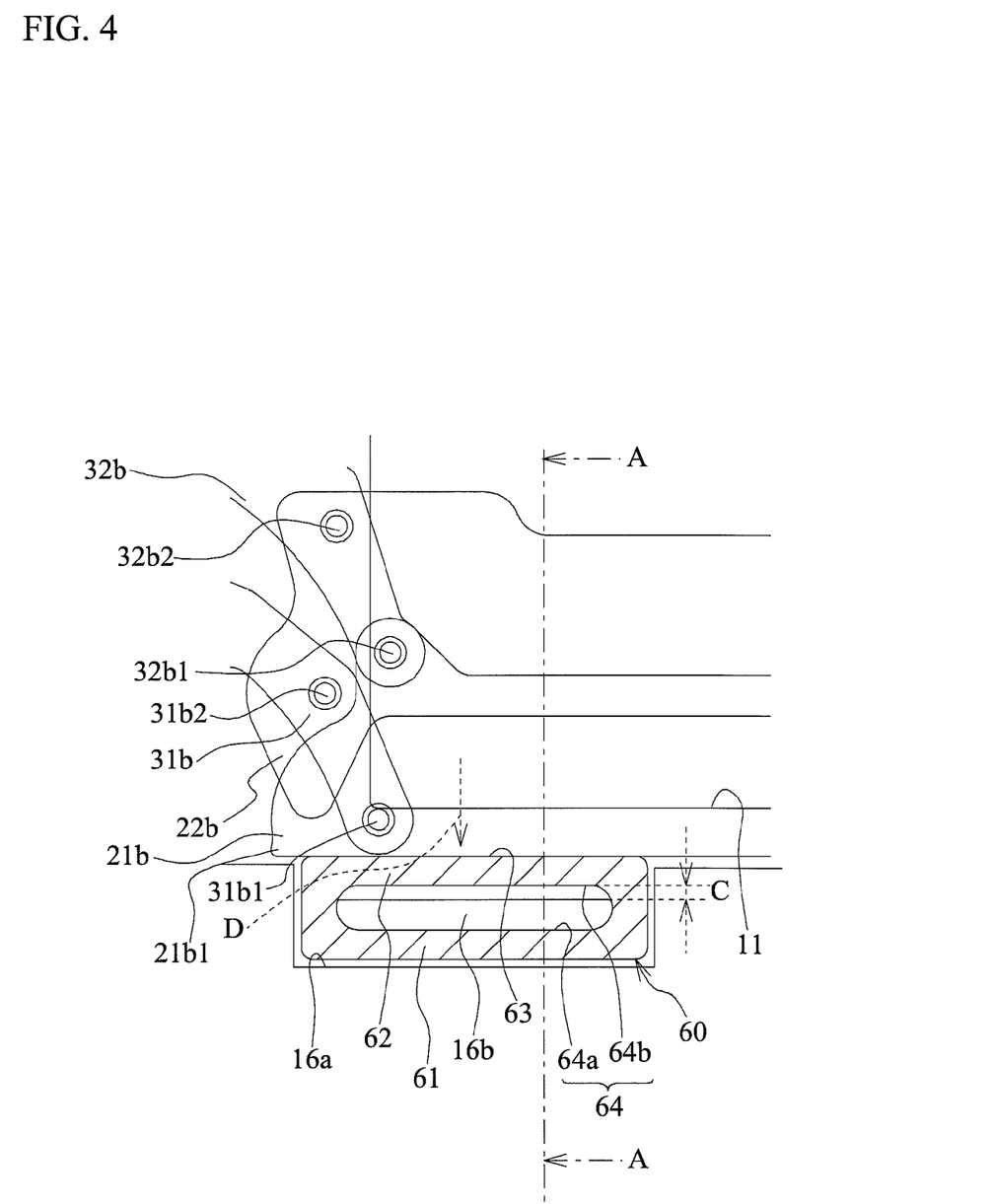
FIG. 4 is an explanatory view of a buffering member.
Figure 5:
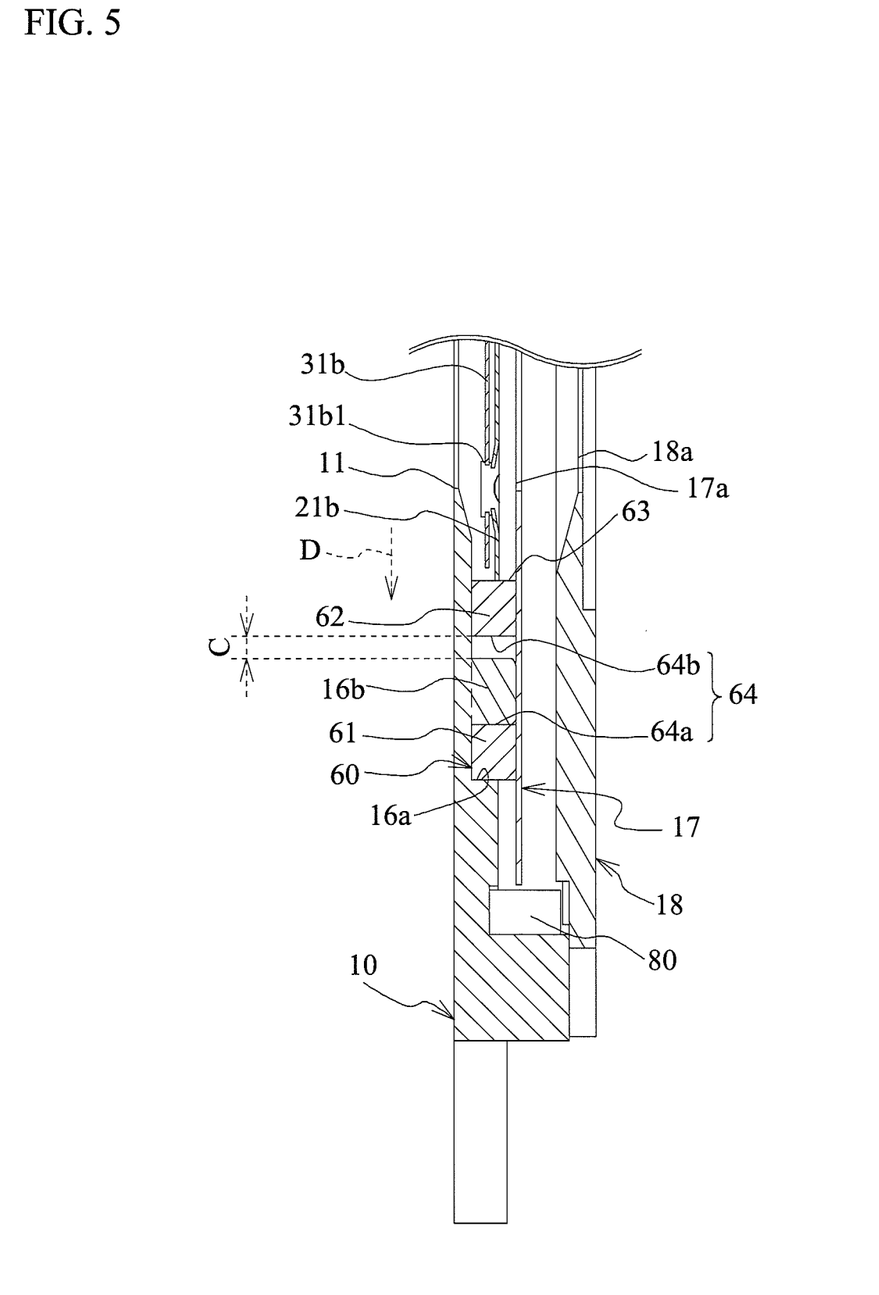
FIG. 5 is an explanatory view of a buffering member.

Next, the buffering member 60 is will be described. FIGS. 4 and 5 are explanatory views of the buffering member 60. FIG. 4 is an enlarged view around the buffering member 60 in the state just after the exposure operation is finished as illustrated in FIG. 1. Additionally, the leading blades 20A are omitted in FIG. 4, and FIG. 4 is a perspective view. Also, FIG. 4 illustrates a movable direction D of the trailing blades 20B when the trailing blades 20B close the opening 11.

Firstly, a description will be given of the coupling of the blade 21b to the drive arms 31b and 32b. The blade 21b is rotatably coupled to the drive arm 31b through a joint portion 31b1, and rotatably coupled to the drive arm 32b through a joint portion 32b1. The blade 21b and the drive arms 31b and 32b act as a parallel linkage mechanism. The joint portions 31b1 and 32b1 are respectively provided at one end portions of the drive arms 31b and 32b. Likewise, the blade 22b is rotatably coupled to the drive arm 31b through the joint portion 31b2, and is rotatably coupled to the drive arm 32b through the joint portion 32b2. The other blades 23b and 24b are coupled to the drive arms 31b and 32b though the same structure. These joint portions 31b1, 31b2, 32b1, and 32b2 are caulking pins.

Next, the buffering member 60 is will be described. FIG. 5 is a sectional view taken along a line A-A of FIG. 4. Also, the leading blades 20A, the blade 22b, and the drive arm 32b are omitted in FIG. 5. As illustrated in FIG. 5, a rear board 18 is secured to the rear side of the board 10. The rear board 18 is formed with an opening 18a corresponding to the opening 11 of the board 10. A partition board 17 is arranged between the board 10 and the rear board 18. The partition board 17 is formed with an opening 17a corresponding to the openings 11 and 18a. The trailing blades 20B, and the drive arms 31b and 32b are housed between the board 10 and the partition board 17. The leading blades 20A, and the drive arm 31a and 32a are housed between the rear board 18 and the partition board 17.

As illustrated in FIG. 5, the buffering member 60 is housed between the board 10 and the partition board 17. The buffering member 80 is arranged apart from the partition board 17 and housed between the board 10 and the rear board 18. As illustrated in FIG. 4, the buffering member 60 has a loop shape, and is made of a rubber elastically deformable. The board 10 is formed with a first holding portion 16a having a substantially rectangular shape corresponding to an outer shape the buffering member 60. A second holding portion 16b is formed in the first holding portion 16a and fits into the buffering member 60. The first holding portion 16a is arranged outside the buffering member 60. The second holding portion 16b is arranged inside the buffering member 60. The second holding portion 16b has a projection shape.

The buffering member 60 includes a sandwiched portion and a non-sandwiched portion which face each other via the second holding portion 16b. A sandwiched portion 61 of the buffering member 60 is sandwiched between the first holding portion 16a and the second holding portion 16b. A non-sandwiched portion 62 of the buffering member 60 is not sandwiched between the first holding portion 16a and the second holding portion 16b. The non-sandwiched portion 62 abuts against the blade 21b. That is, the buffering member 60 is held in such a manner that the sandwiched portion 61 as a part of the buffering member 60 is sandwiched between the first holding portion 16a and the second holding portion 16b.

The buffering member 60 includes an inner peripheral surface 64 fitted onto the second holding portion 16b. The inner peripheral surface 64 has an oblong-hole shape extending in a direction substantially perpendicular to the movable direction D. The inner peripheral surface 64 includes a first inner peripheral surface 64a and a second inner peripheral surface 64b which face each other via the second holding portion 16b. The first inner peripheral surface 64a is arranged at the sandwiched portion 61 side, and the second inner peripheral surface 64b is arranged at the non-sandwiched portion 62 side.

As illustrated in FIGS. 4 and 5, a given clearance C is set between the second holding portion 16b and the non-sandwiched portion 62. Specifically, the first inner peripheral surface 64a is in substantially close contact with the second holding portion 16b, whereas the second inner peripheral surface 64b is arranged apart from the second holding portion 16b. For this reason, the buffering member 60 is deformable such that the loop shape is warped by an amount of the clearance C. That is, the buffering member 60 is elastically deformable to be crushed in the movable direction D of the blade 21b by abutting against the blade 21b. In such a way, the buffering member 60 is partially held for deformation such that the loop shape of the buffering member 60 is warped.

As mentioned above, the buffering member 60 is deformable such that the loop shape is warped by abutting against the blade 21b. In such a way, the warping of the loop shape of the buffering member 60, in addition to the elasticity of the buffering member 60 itself, can suppress the blade 21b from bounding when the blade 21b abuts the buffering member 60. This can prevent the opening 11 from being partially opened by bounding the blade 21b.

When the blade 21b abuts the buffering member 60, the joint portion 31b1 of the drive arm 31b and the buffering member 60 are arranged in the movable direction D in which the blade 21b moves toward the buffering member 60. Likewise, when the blade 21b abuts the buffering member 60, the joint portion 32b1 of the drive arm 32b and the buffering member 60 are arranged in the movable direction D of the blade 21b. This can suppress the impact from being applied to a portion, to which the largest impact is to be applied, around the joint portions 31b1 and 31b2 of the blade 21b. This improves the endurances of the blade 21b and the drive arm 31b.

In cases where the buffering member 60 is arranged such that the joint portions 31b1 and 32b1 and the buffering member 60 are not arranged in the movable direction D when the blade 21b abuts the buffering member 60, a problem might arise as follows: The blade 21b might incline about the joint portions 31b1 and 31b2 when abutting the buffering member 60. Thus, the blade 21b might not be moved in parallel at a constant attitude. However, the joint portions 31b1 and 32b1 and the buffering portion 60 are arranged in the movable direction D when the blade 21b abuts the buffering member 60, thereby preventing the blade 21b from inclining when the blade 21b abuts the buffering member 60.

Also, the buffering member 60 includes a linear portion 63 as illustrated in FIG. 4. The linear portion 63 is arranged along an edge portion having a linear shape of the blade 21b abuttable with the buffering member 60. This prevents the blade 21b from inclining when the blade 21b abuts the buffering member 60. Even more particularly, this can disperse the impact, caused by abutting the blade 21b with the buffering member 60, applied to the blade 21b.

Also, as illustrated in FIG. 4, in the state where the edge portion having the linear shape of the blade 21b abuts the linear portion 63 of the buffering portion 60, one end 21b1 of the edge portion having the linear shape of the blade 21b does not abut the linear portion 63 of the buffering member 60. With this configuration, the impact, caused by abutting the blade 21b with the buffering member 60, does not concentrate on one end 21b1 of the edge portion having the linear shape of the blade 21b and the linear portion 63 of the buffering member 60. For this reason, this can prevent one end 21b1 of the edge portion having the linear shape of the blade 21b or the linear portion 63 of the buffering member 60 from being partially damaged. Additionally, the drive arm 31b does not abut the buffering member 60 as illustrated in FIGS. 4 and 5. Specifically, an end of the drive arm 31b is coupled to the blade 21b not to protrude from the blade 21b.

Figure 6:
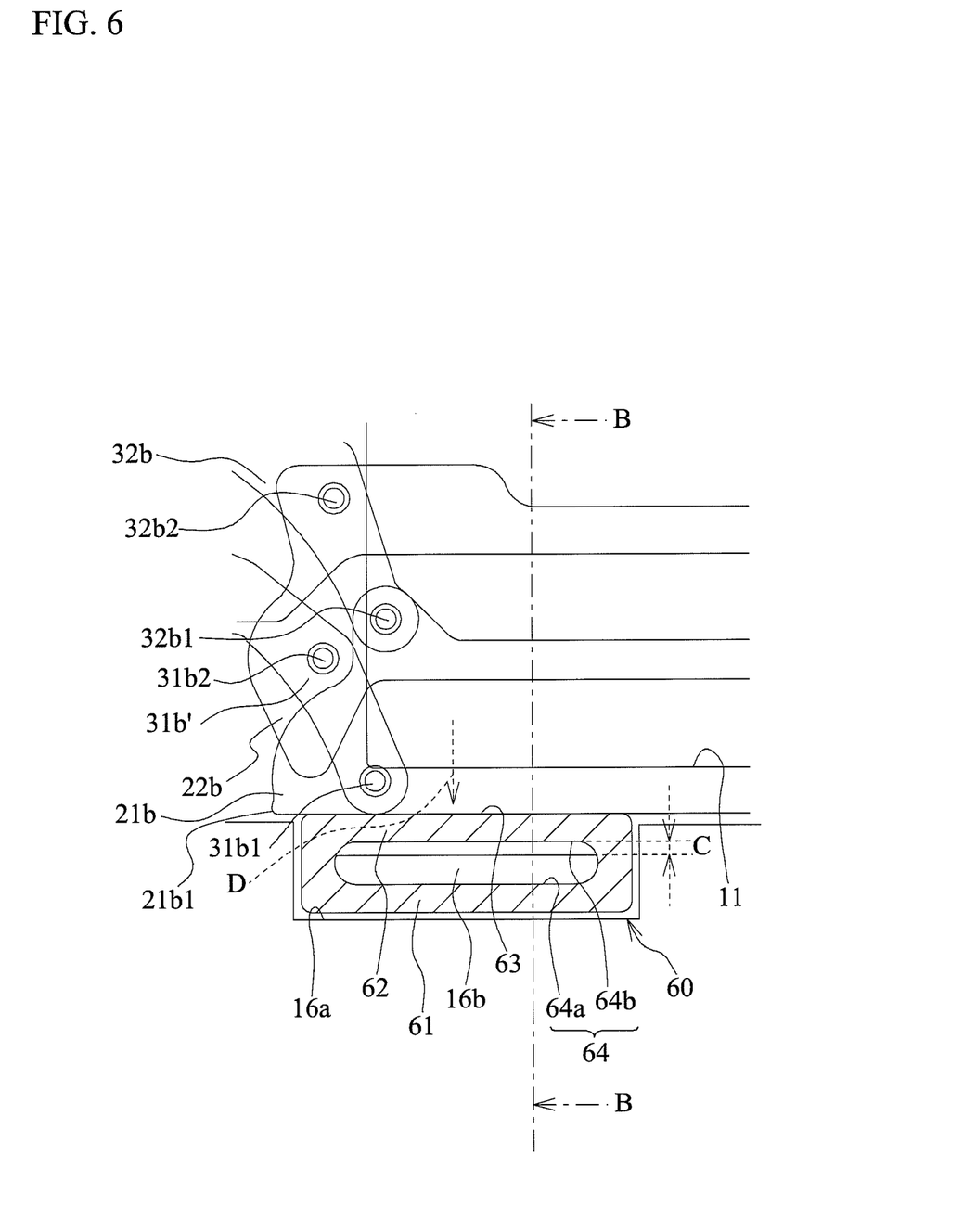
FIG. 6 is an explanatory view of a blade driving device according to a first variation.
Figure 7:
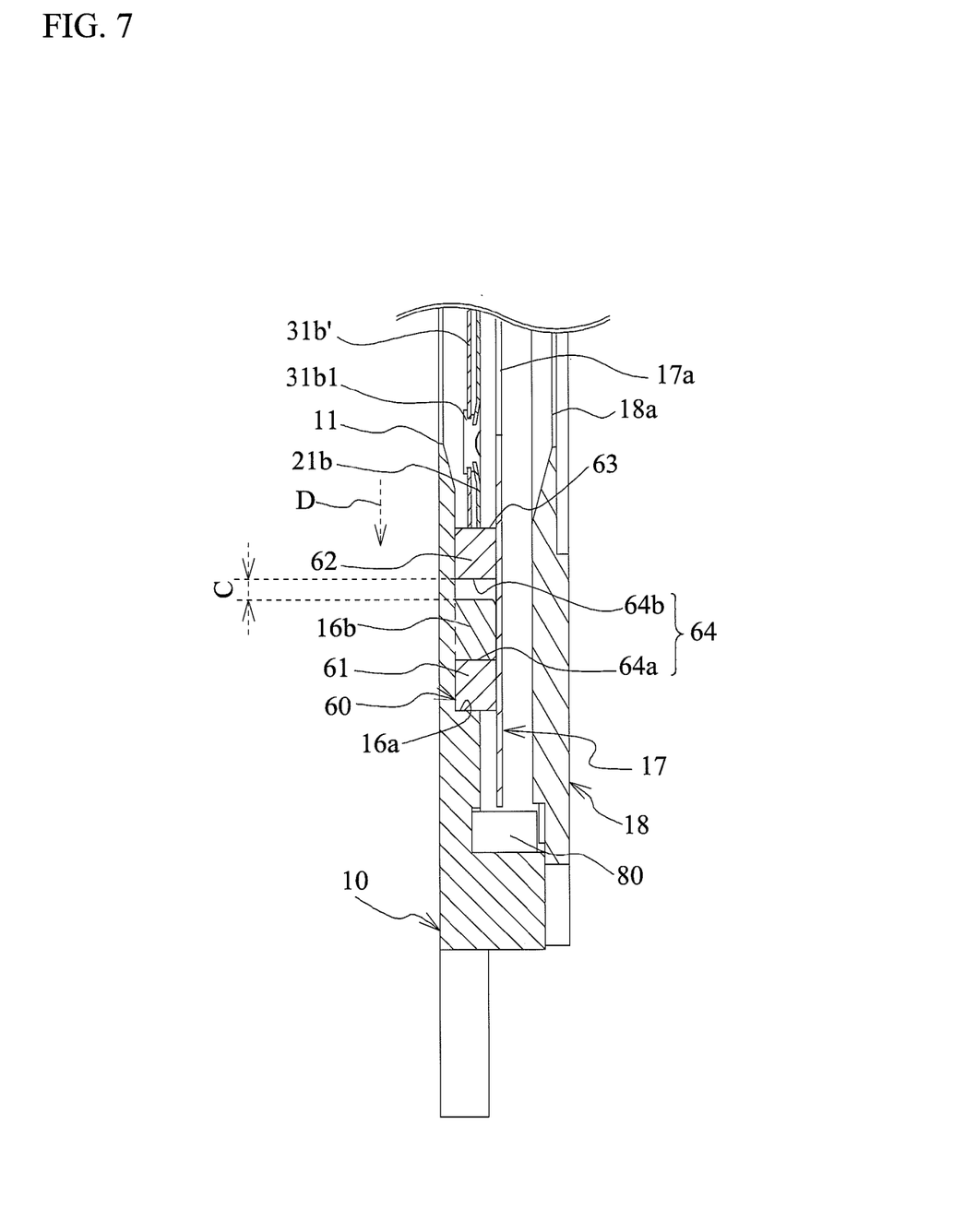
FIG. 7 is an explanatory view of the blade driving device according to the first variation.

Next, a blade driving device according to a first variation will be described. Herein, in the description, components similar to those in the above described embodiment are designated with the same reference numerals. FIGS. 6 and 7 are explanatory views of a blade driving device according to the first variation. FIG. 7 is a sectional view taken along line B-B of FIG. 6. As illustrated in FIGS. 6 and 7, the blade 21b and an end of a drive arm 31b' driving the blade 21b abut the buffering member 60 at almost the same time, when the blade 21b abuts the buffering member 60.

Figure 8:
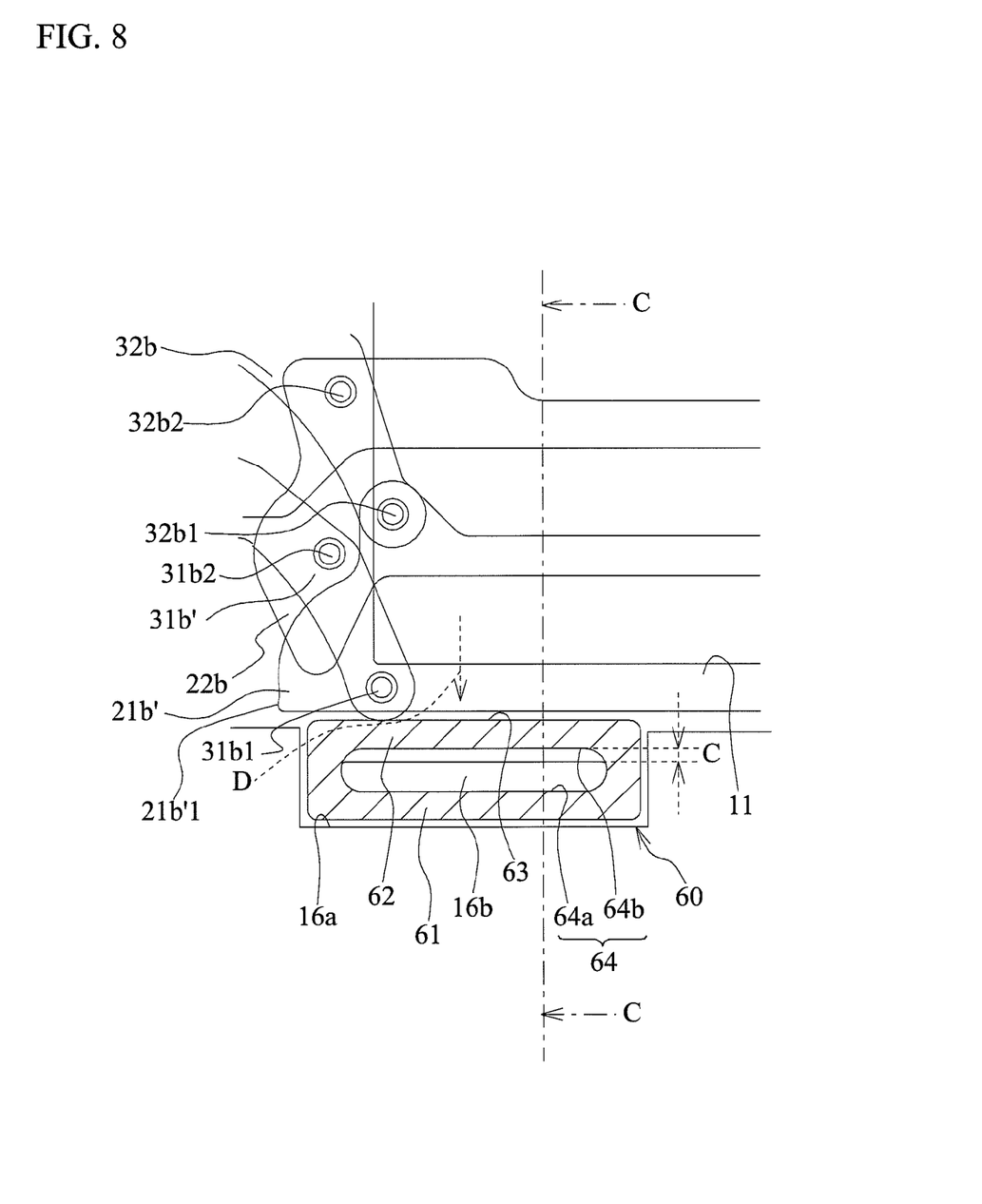
FIG. 8 is an explanatory view of a blade driving device according to a second variation.
Figure 9:
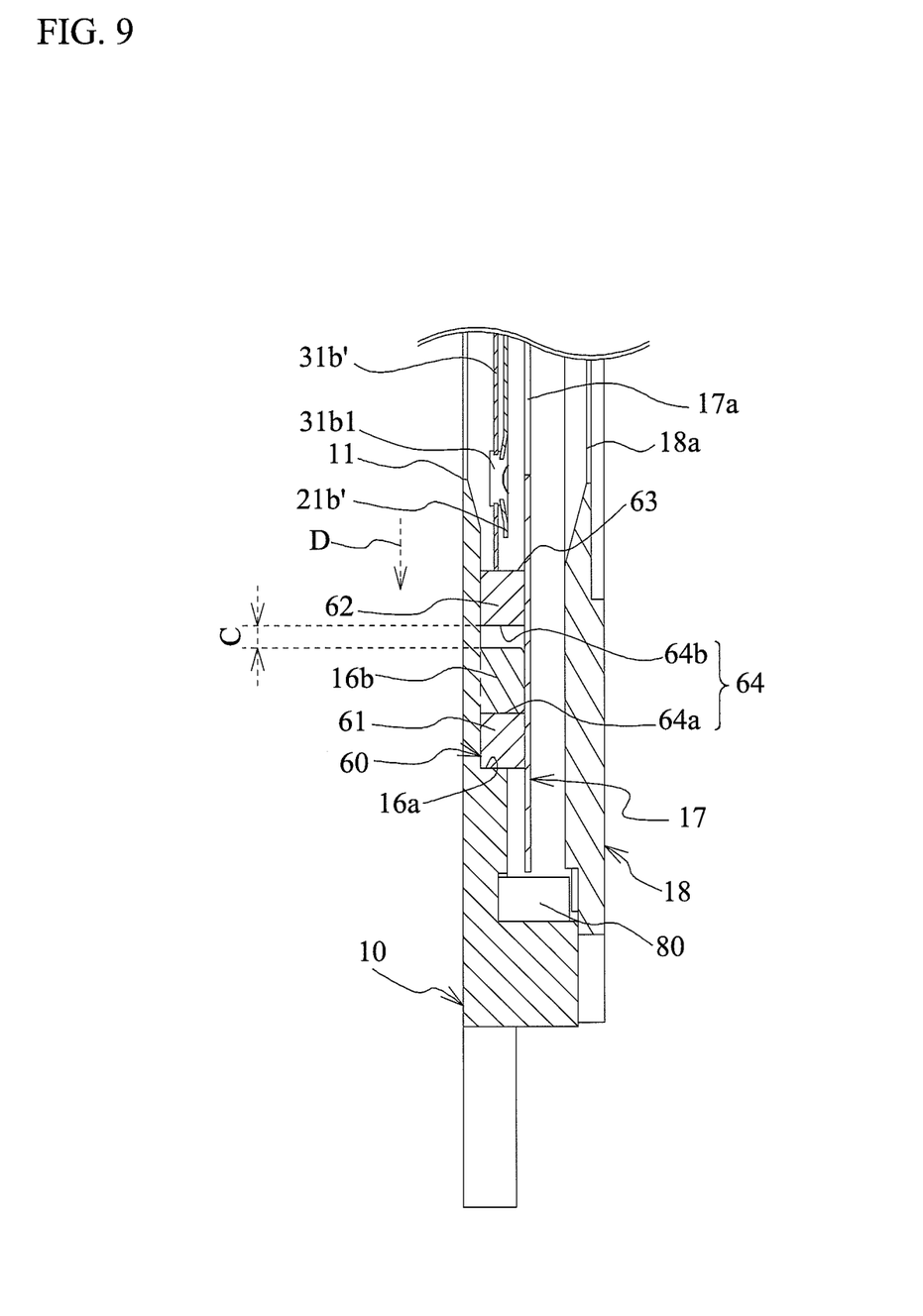
FIG. 9 is an explanatory view of the blade driving device according to the second variation.

Next, a blade driving device according to a second variation will be described. FIGS. 8 and 9 are explanatory views of the blade driving device according to the second variation. FIG. 9 is a sectional view taken along line C-C of FIG. 8. As illustrated in FIGS. 8 and 9, the drive arm 31b' driving the blade 21b' abuts the buffering member 60 without abutting the blade 21b' with the buffering member 60. In such a way, the drive arm 31b' abuts the buffering member 60, thereby suppressing the blade 21b' from bounding. In this case, an exclusive buffering member may be provided for the blade 21b'.

Also, one end 21b'1 of the edge portion with the linear shape of the blade 21b' does not abut the linear portion 63 of the buffering member 60 as illustrated in FIG. 8, like the description in FIG. 4. With this configuration, the impact does not concentrate on an abutting portion where one end 21b'1 of the edge portion having the linear shape of the blade 21b' abuts the linear portion 63 of the buffering member 60, when the blade 21b' abuts and deforms elastically the buffering member 60 after the drive arm 31b' abuts the buffering member 60. For this reason, this can prevent one end 21b'1 of the edge portion having the linear shape of the blade 21b' or the linear portion 63 of the buffering member 60 from being partially damaged.

While the exemplary embodiments of the present invention have been illustrated in detail, the present invention is not limited to the above-mentioned embodiments, and other embodiments, variations and modifications may be made without departing from the scope of the present invention.

In the embodiment, the buffering member 60 has a substantially rectangular shape, but is not limited to this. For example, the buffering member 60 may have an elliptical shape, a circular shape, a triangle shape, or a polygonal shape.

A buffering member having a loop shape like the buffering member 60 according to the embodiment may be employed as a buffering member which at least one of the leading blades 20A abuts. Also, a buffering member like the buffering member 60 according to the embodiment may be employed as a buffering member which the leading-blades drive lever 40A or the trailing-blades drive lever 40B abuts.

In the embodiment, the focal plane shutter has been described as an example of the blade driving device. However, the blade driving device is not limited to the focal plane shutter. For example, the blade driving device may include a blade which swings about a given position relative to a board formed with an opening and changes a state of the opening. It is only necessary for this blade to define the opening of the board in at least one state of a fully closed state and a small aperture state.

Although the blade having a thin shape and made of a synthetic resin has been described in the present embodiment, the blade having the thin shape may be made of a metal.

Finally, several aspects of the present invention are summarized as follows.

According to an aspect of the present invention, there is provided a blade driving device including: a board including an opening; a blade movable between a position receding from the opening and a position overlapping at least a part of the opening; and a buffering member having a loop shape, having an elasticity, abutting the blade at an end of a movable range of the blade, and being deformable such that the loop shape is warped when abutting against the blade.

The buffering member is deformable such that the loop shape is warped by abutting against the blade. In such a way, the warping of the loop shape of the buffering member, in addition to the elasticity of the buffering member itself, can suppress the blade from bounding.

According to another aspect of the present invention, there is provided a blade driving device including: a board including an opening; a blade movable between a position receding from the opening and a position overlapping at least a part of the opening; a drive member driving the blade; and a buffering member having a loop shape, having an elasticity, abutting the drive member at an end of a movable range of the blade, and being deformable such that the loop shape is warped when abutting against the drive member.

The buffering member is deformable such that the loop shape is warped by abutting against the drive member driving the blade. In such a way, the warping of the loop shape of the buffering member, in addition to the elasticity of the buffering member itself, can suppress the drive member from bounding. This also can suppress the blade from bounding.

According to another aspect of the present invention, there is provided an optical instrument including the above blade driving device.

What is claimed is:

1. A blade driving device comprising:
a board including an opening;
a blade movable between a position receding from the opening and a position overlapping at least a part of the opening;
a drive member driving the blade;
a joint portion provided in the drive member and coupled to the blade; and
a buffering member having a loop shape defined in part by an inner peripheral surface, having an elasticity, abutting the blade at an end of a movable range of the blade, and being deformable such that the loop shape is warped by movement of an unsupported portion of the inner peripheral surface when abutting against the blade, wherein:
a direction of a line connecting the joint portion and a portion of the buffering member is the same as a direction in which the blade moves toward the buffering member when the blade and the buffering member abut each other;
the board includes a holding portion holding a part of the buffering member such that the buffering member is deformable to warp the loop shape;
the holding portion includes a first holding portion arranged outside the buffering member, and a second holding portion arranged inside the buffering member;
the buffering member includes a sandwiched portion sandwiched between the first and second holding portions, and a non-sandwiched portion not sandwiched between the first and second holding portions; and
a given clearance is provided between the second holding portion and the non-sandwiched portion.

2. The blade driving device of claim 1, wherein the drive member abuts the buffering member together with the blade.

3. The blade driving device of claim 1, wherein the buffering, member includes a linear portion along an edge portion having a linear shape of the blade, the edge portion being abuttable with the buffering member.

4. The blade driving device of claim 3, wherein one end of the edge portion having the linear shape of the blade does not abut the linear portion of the buffering member when the blade and the buffering member abut each other.

5. A blade driving device comprising:
a board including an opening;
a blade movable between a position receding from the opening and a position overlapping at least a part of the opening;
a drive member driving the blade;
a joint portion provided in the drive member and coupled to the blade; and
a buffering member having a loop shape defined in part by an inner peripheral surface, having an elasticity, abutting the drive member at an end of a movable range of the blade, and being deformable such that the loop shape is warped by movement of an unsupported portion of the inner peripheral surface when abutting against the drive member, wherein:
a direction of a line connecting the joint portion and a portion of the buffering member is the same as a direction in which the blade moves toward the buffering member when the blade and the buffering member abut each other;
the board includes a holding portion holding a part of the buffering member such that the buffering member is deformable to warp the loop shape;
the holding portion includes a first holding portion arranged outside the buffering member, and a second holding portion arranged inside the buffering member;
the buffering member includes a sandwiched portion sandwiched between the first and second holding portions, and a non-sandwiched portion not sandwiched between the first and second holding portions; and
a given clearance is provided between the second holding portion and the non-sandwiched portion.

6. The blade driving device of claim 5, wherein the buffering member includes a linear portion along an edge portion having a linear shape of the blade, the edge portion being abuttable with the buffering member.

7. The blade driving device of claim 6, wherein one end of the edge portion having the linear shape of the blade does not abut the linear portion of the buffering member when the blade and the buffering member abut each other.

8. An optical instrument comprising a blade driving device, the blade driving device including:
a board including an opening;
a blade movable between a position receding from the opening and a position overlapping at least a part of the opening;
a drive member driving the blade;
a joint portion provided in the drive member and coupled to the blade: and
a buffering member having a loop shape defined in part by an inner peripheral surface, having an elasticity, abutting the blade at an end of a movable range of the blade, and being deformable such that the loop shape is warped by movement of an unsupported portion of the inner peripheral surface when abutting, against the blade, wherein:
- a direction of a line connecting the joint portion and a portion of the buffering member is the same as a direction in which the blade moves toward the buffering member when the blade and the buffering member abut each other;
- the board includes a holding portion holding a part of the buffering member such that the buffering member is deformable to warp the loop shape;
- the holding portion includes a first holding portion arranged outside the buffering member, and a second holding portion arranged inside the buffering member;
- the buffering member includes a sandwiched portion sandwiched between the first and second holding portions, and a non-sandwiched portion not sandwiched between the first and second holding portions; and
- a given clearance is provided between the second holding portion and the non-sandwiched portion.

9. An optical instrument comprising a blade driving device, the blade driving device including:
- a board including an opening;
- a blade movable between a position receding from the opening and a position overlapping at least a part of the opening;
- a drive member driving the blade;
- a joint portion provided in the drive member and coupled to the blade; and
- a buffering member having a loop shape defined in part by an inner peripheral surface, having an elasticity, abutting the drive member at an end of a movable range of the blade, and being deformable such that the loop shape is warped by movement of an unsupported portion of the inner peripheral surface when abutting against the drive member wherein:
- a direction of a line connecting the joint portion and a portion of the buffering member is the same as a direction in which the blade moves toward the buffering member when the blade and the buffering member abut each other;
- the board includes a holding portion holding a part of the buffering member such that the buffering member is deformable to warp the loop shape;
- the holding portion includes a first holding portion arranged outside the buffering member, and a second holding portion arranged inside the buffering member;
- the buffering member includes a sandwiched portion sandwiched between the first and second holding portions, and a non-sandwiched portion not sandwiched between the first and second holding portions; and
- a given clearance is provided between the second holding portion and the non-sandwiched portion.

* * * * *